United States Patent [19]

Tamura et al.

[11] 4,005,307
[45] Jan. 25, 1977

[54] METHOD AND APPARATUS FOR JUDGING QUALITY OF SPOT WELD

[75] Inventors: Yukio Tamura; Yoshikazu Tanaka; Satoshi Kuroiwa; Mikiji Suzuki, all of Toyota, Japan

[73] Assignee: Toyota Jidosha Kogyo Kabushiki Kaisha, Japan

[22] Filed: June 3, 1975

[21] Appl. No.: 583,252

[30] Foreign Application Priority Data

Sept. 17, 1974 Japan .................. 49-106895

[52] U.S. Cl. ............................................. 219/109
[51] Int. Cl.² ..................................... B23K 11/24
[58] Field of Search ............ 219/86, 109, 108, 110, 219/117

[56] References Cited

UNITED STATES PATENTS

| | | | |
|---|---|---|---|
| 2,851,584 | 9/1958 | Sciaky | 219/86 |
| 3,400,242 | 9/1968 | Waller | 219/110 |
| 3,404,252 | 10/1968 | Michael | 219/110 |
| 3,443,056 | 5/1969 | Ramaley et al. | 219/109 |
| 3,449,541 | 6/1969 | Wilcox et al. | 219/110 |
| 3,569,659 | 3/1971 | Benton et al. | 219/117 R |
| 3,585,347 | 6/1971 | Needham et al. | 219/117 |
| 3,609,285 | 9/1971 | Scarpelli et al. | 219/109 |
| 3,632,956 | 1/1972 | Herbst | 219/109 |
| 3,708,648 | 1/1973 | Croucher et al. | 219/117 R |

OTHER PUBLICATIONS

D. N. Waller et al., "Electrode Separation Applied to Quality Control in Resistance Welding", *Welding Research Supplement,* pp. 168-174, Apr. 1965.

K. I. Johnson et al., "New Design of Resistance Spot Welding Machine for Quality Control", *Welding Research Supplement,* pp. 122-131, Mar. 1972.

*Primary Examiner*—Arthur T. Grimley
*Assistant Examiner*—Clifford C. Shaw
*Attorney, Agent, or Firm*—Browdy and Neimark

[57] ABSTRACT

A resistance spot welding method and apparatus wherein a weld can be judged to have an acceptable strength whether a splash (expulsion of weld metal) has occurred or not, provided that a maximum displacement (M) of a movable electrode to a fixed one is larger than a certain predetermined reference value ($M_L$) or a rate (R) of the displacement at an initial stage is larger than a certain predetermined reference value ($R_L$) which is defined between two certain predetermined reference values ($R_1$, $R_E$), by sensing the displacement and the rate thereof. Furthermore, when necessary, a weld is judged to have an acceptable indentation (I), as well, by sensing a position of the electrode at a specific point of time when a predetermined holding time has elasped from the time of de-energization of the welding current. Thus reliability of a spot welded joint is much improved and costly rejection of a welded product is considerably reduced.

5 Claims, 5 Drawing Figures

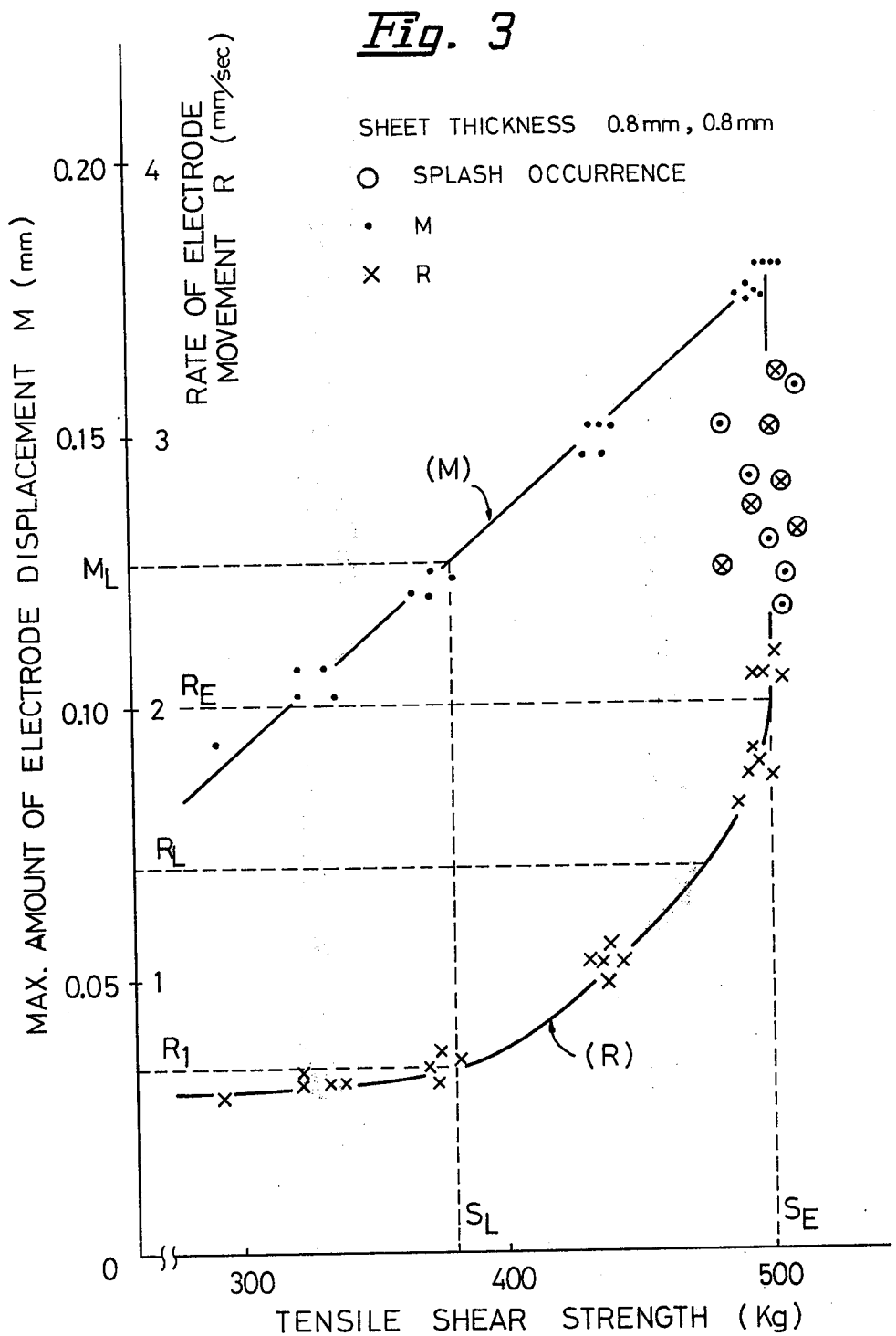

METHOD AND APPARATUS FOR JUDGING QUALITY OF SPOT WELD

FIELD OF THE INVENTION

The present invention relates to a method and apparatus for judging or determining qualities such as strength and indentation of a resistance spot weld by monitoring the relative displacement of two electrodes, a movable and a fixed electrode, and the rate of the displacement.

Such a judgement is very effective, for example, in the case of an automobile manufacturing plant where a number of spot welds are performed at a time, and quality control of welded products is very critical from safety as well as economy viewpoints, e.g., splashed welds should not be rejected merely because of the occurrence of a splash. The judgement, however, must be done quickly, and efficiently, e.g., automatically and simultaneously with completion of a weld.

BACKGROUND OF THE INVENTION

There have been publicly known various research reports or patents on quality monitoring of a welded product, automatically, non-destructively and/or simultaneously with completion of the welding operation.

Among them, a monitoring system referring to the relative displacement of two confronting electrodes is generally admitted to be more practical than others. (The relative displacement takes places due to expansion, shrinking and/or indentation of the welded portion or nugget).

Therefore, a number of patents and literature articles are known as prior art which are basically intended to monitor or to control the weld quality by utilizing a maximum value of the relative displacement (during one cycle of welding operation) or the rate of the displacement.

These prior art methods are classified in three categories as follows:

1. a method of comparing the maximum amount of the displacement with a predetermined standard (U.S. Pat. No. 2,851,584), or of controlling welding current so that said amount of the displacement shall fall into a predetermined value (U.S. Pat. No. 3,569,659), 2. a method of comparing the rate of the displacement at an intial stage of one welding operation cycle with a predetermined standard rate (Welding Journal, April '65 "Electrode Separation Applied to Quality Control in Resistance Welding", U.S. Pat. No. 3,400,242, Welding Research International Vol. 2, No. 1, 1972), and 3. a method of controlling welding current so that the relation between time and electrode displacement shall coincide with a predetermined characteristic curve (U.S. Pat. No. 3,404,252).

Having both merits and demerits, however, these prior inventions cannot be practically employed for fabrication, such as automobiles, in which the "splashing" may be accepted under certain conditions as described hereinafter.

For example, in an assembly line of an automobile manufacturing factory, thousands of welding units are usually worked for a unit car, inevitably resulting in a voltage drop due to simultaneous operation of welding units and consumption of electrode tips (i.e., increasing of the tip diameter). Furthermore, there are operated a number of welding machines of the so called series type in which a shunting current, i.e., a current ineffective to welding often occupies as much as 30% of the total current. For these reasons the practical welding current shall be comparatively larger than the standard specification recommended by RWMA (Resistance Welding Machine Manufacturers' Association). In spite of such a large current being used, strength of a welded joint may be unexpectedly reduced when some of the disadvantageous factors affect together at a time. Therefore, it is very important to establish a reliable method of judging or determining weld qualities in order to prevent the aforesaid shortcomings of resistance spot welding.

Particularly, reliable methods and apparatus have been desired to take into consideration the occurance of splash to which such conditions as mentioned above are very susceptible.

SUMMARY OF THE INVENTION

It is a primary object of the present invention to provide an improved method and apparatus for judging strength of a resistance spot weld reliably, automatically and simultaneously with completion thereof, irrespective of splash occurrence, by monitoring the displacement of the movable electrode and a rate or time derivative thereof.

It is another object of the present invention to provide an improved method and apparatus for judging a resistance spot weld to have an acceptable strength, irrespective of splash occurrence, provided that a maximum displacement (M) of a movable electrode exceeds a certain predetermined reference value ($M_L$), or a rate or time derivative (R) of the displacement at an initial stage of a welding cycle exceeds a certain predetermined reference value ($R_L$) by monitoring the electrode movement and the rate thereof, said reference values being established on S-M and S-R curves both of which are to be illustrated from values M and R against values S, being experimentally obtained from spot welding of test pieces.

It is a further object of the present invention to provide an improved method and apparatus for judging at the same time as the strength judgement mentioned above, whether or not the depth of indentation (I) is acceptable.

It is still another object of the present invention to provide an apparatus for judging the strength of a spot weld automatically excluding the effect of an electrode tip wearing, or free from resetting of a monitoring level in the case of electrode tip wearing, or electrode replacement.

These and other objects will be more fully understood by referring to the accompanied drawings.

BRIEF DESCRIPTION OF THE DRAWING

FIG. 3 shows graphs of maximum relative displacement M and rate of displacement R against tensile-shearing strength of welded joints on 0.8 mm thick mild steel plates. Splash occurrence is shown by a symbol O.

DETAILED DESCRIPTION OF THE INVENTION

In order that the present invention may be better understood, the results on experimental tests will now be described in detail with reference to FIGS. 1–3. These tests were carried out on two cold rolled mild steel sheets which were resistance spot welded with two types of welding machines. One is a direct welding type in which two electrodes are to be set on opposite sides of the workpieces to be welded so that the welding current may flow directly threrethrough, and the other is a series type in which two electrodes on one side of the workpieces and a back up electrode on the other side are disposed. In each case, electrode tips of two different sizes in diameter were selected in order to get effect on electrode wearing, i.e., 6 mm electrode as a before-wearing case and 8 mm as an after one.

Figure 1:
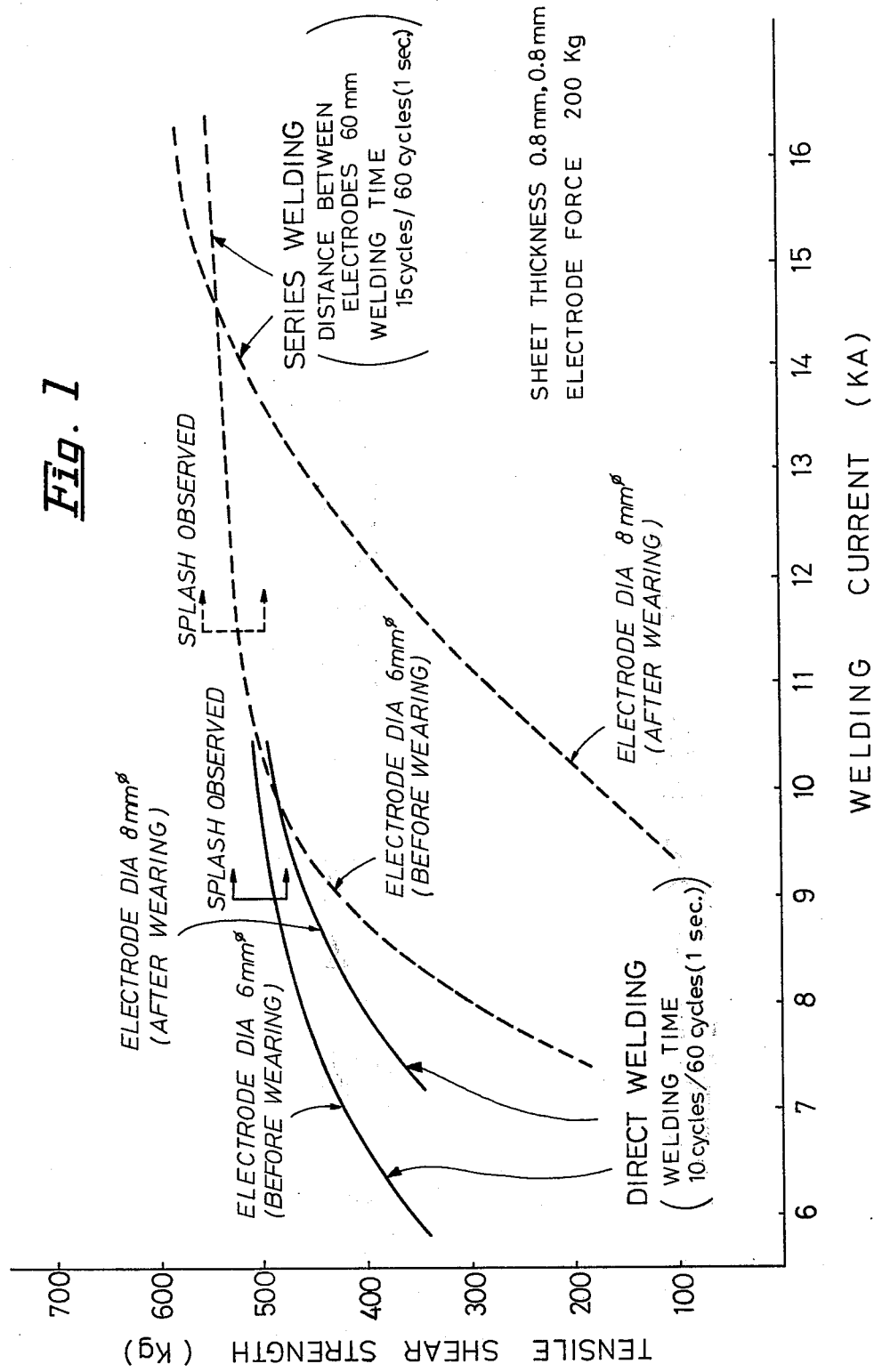
FIG. 1 shows graphs of tensile shear strength (kg) against welding current (1,000 A) for two kinds of electrode tips, before and after wearing, both by direct and series welding on two mild steel sheets, each 0.8 mm in thickness.

The test results were plotted on four curves in FIG. 1, wherein the weder type difference and the size of electrode tips are selected as parameters. Splash occurrence or its condition (current and strength) is also shown in FIG. 1. It should be noted that splash occurrence gives no advserse effect to weld strength, but tip wearing remarkably affects a decline in weld strength, while increase of welding current intensity improves the strength almost in all cases. It is worthy of note that the strength can be maintained high enough even when a splash has occurred so long as the current intensity is kept large enough. In other words, increasing of welding current intensity will prevent declination of weld strength due to splashing and/or electrode tip wearing.

In monitoring weld quality by the present invention, the influence of electrode wearing (consumption) can be automatically excluded as described later in detail, as will the particularly important manner of handling splash occurrence.

It will be, therefore, unwise to reject welded products only by reason that a splash has been observed thereon, especially in repetitive mass production, because such a quality control may lead to the rejection of well acceptable products. Splashes should be now admitted as a "necessary evil" in some cases from a stand-point of cost reduction and productivity improvement.

It has been found to be unsuitable to judge weld qualities by any of the aforesaid conventional methods, particularly when splash occurrence is involved, as described hereinafter.

By the first method (1), for example, an acceptable weld may be rejected as "short of strength", because splash occurrence may upset the correlationship between the strength and the maximum displacement which has been kept regular before a splash occurs, as described later.

The second method (2) which depends upon the rate of electrode displacement has an advantage of being unaffected by splash occurrence, but the rate does not show a proportional relationship, especially in the range of lower strength where strict control is required.

The third method (3) is an invention which teaches how to avoid splashes but not how to monitor qualities irrespective of splash occurrence.

In short, any of these prior art methods is unsuitable to attain the objects of the present invention and teaches nothing thereabout.

The present invention has settled the problem how to judge weld qualities, without excluding splash occurrence, or teaches how to determine the conditions with which some of the physical qualities, such as strength and indentation, etc., essentially required on resistance spot welds, are to be warranted.

Figure 2:
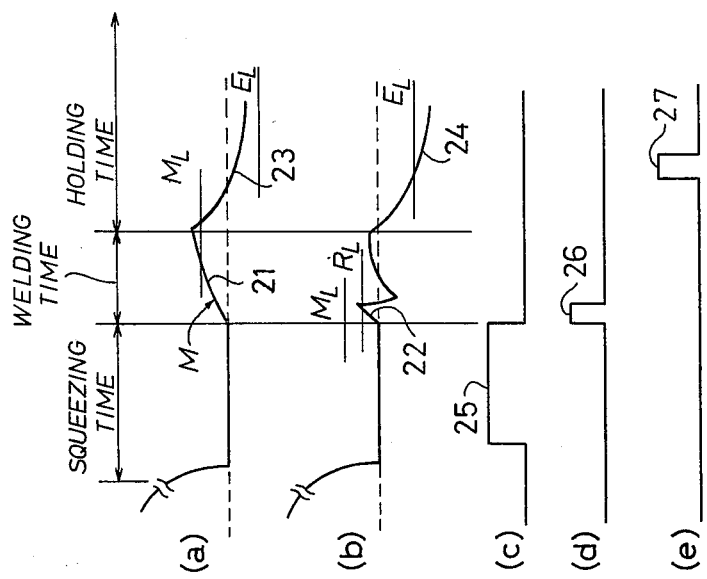
FIG. 2 shows in diagrams and tables, the relationship among intensity of welding current, electrode displacement curve, strength S of welded joints, maximum relative displacement M, rate of displacement R, depth of indentation E, displacement I and occurrence of splash.

Now the present invention is made more understandable by referring to FIG. 2 in which are shown graphical and tabled data obtained on test pieces of 0.8 mm cold rolled steel sheets, overlapped and spot welded under the condition that welding current is selected as a variable but other factors, electrode tip diameter, current duration time (welding time), electrode loading pressure, etc. are all kept constant. There are numerically tabled in FIG. 2 weld strength or tensile shear strength, maximum amount of movable electrode displacement M, rate or time derivative R of the displacement in an initial stage of a welding operation cycle, amount of depth of indentation E which is measured after the welding cycle is completed, and position I of the movable electrode at a certain specific point of time during the holding time of the welding cycle.

In the case of 5,600 A, weld strength is lower than those in other cases, values M, R and E are also small, but no splash is observed.

In the case of 7,500 A which intensity is considered reasonable, the value E is small, no splash is observed, and values M and R as well as the strength S are considerably increased.

In case of 9,000 A which intensity is considered practically applicable, a splash is observed and the indentation is deepest but the weld strength is rather higher than that in the 7,500 A case. It should be noted that the electrode movement curve shows a sudden descent due to splash occurrence and the value M in this case is less than that in 7,500 A case (i.e. correlationship between S and M is broken), but the rate R, which was observed before a splash occurred, shows to keep a fair correlationship with the strength S. It is to be understood that the correlationship between the values, M and S can be varied violently by the splash occurrence.

Furthermore, the depth of indentation E after completion of the operation will be noted to correlate with the absolute amount of the electrode displacement I (or monitored position of said movable electrode) at a certain specific point of time during the holding time.

In FIG. 3, the curve (M) shows the relationship between the maximum displacement m and the strength S and the curve (R) between the rate R of the displacement and the strength S.

Although the value M strictly relates or is linearly proportioned to the strength S in a range where splash does not occur, once a splash occurs, the value M will rapidly decrease and therefore the relationship between M and S will be completely eliminated.

If strength of products is judged only by monitoring the value M, as is usual in the prior art, some products which are practically acceptable may be rejected. On the other hand, the value of the rate R does not show a fair correlationship against the value of the strength S in a neighboring range of a lower limit $S_L$ of strength required.

Strength judgement only by monitoring the value R will result in increasing misjudgement, especially in the neighnboring range of $S_L$; however, in a neighboring range of maximum strength $S_E$ to obtain which it is necessary to admit the occurrence of some maximum splash, there is no possibility of misjudging the minimum weld strength, even when splashes occur, since the reference rate value $R_L$ is established in a larger value range. It should be understood that $S_E$ is, in practice, the maximum strength obtainable for the spot welded joint. Since splash frequently occurs in the neigboring range of $S_E$, it is necessary to admit such splash occurrence.

In conclusion, it will be surely safe that a spot welded product is judged or decided to have an acceptable strength, provided that either of the following two conditions is satisfied: the monitored relative displacement value M is larger than the reference value $M_L$ pre-established for the product, or the monitored rate value R is larger than the reference $R_L$ pre-established for the product wherein said reference value $M_L$ is established as an amount of maximum displacement of the electrode corresponding to the critical strength value $S_L$, selected as a standard reference value for judging the strength of the product, and said reference value $R_L$ is established between a pair of reference values $R_1$ and $R_E$, the former, $R_1$, being established as a rate value corresponding to the critical strength value $S_L$ and the latter $R_E$ being established as another rate value corresponding to maximum strength value $S_E$.

In short, a spot welded product can be judged to have an acceptable strength, if either of the following two inequities is satisfied:

$$M > M_L, \text{ or} \tag{1}$$

$$R > R_L, \text{ where } R_E > R_L > R_1 \tag{2}$$

The reason of this conclusion may be explained as follows:

i. When a splash occurs and even when $M < M_L$, the strength S of the product can be judged as $S > S_L$, provided that $R > R_L$. (Because the condition of the inequality, $R > R_L$ warrants the condition of the inequality, $S > S_L$.)

ii. When no splash occurs and even when $R < R_L$, the strength S can be judged as $S > S_L$, provided that $M > M_L$. (Because the condition, $M > M_L$ warrants $S > S_L$.)

The value $R_L$ should be selected according to the actual conditions of the product, such as thickness and shape of the workpieces being welded, etc., and it is desirable to be established with proper allowance to $R_1$, i.e., substantially larger than $R_1$.

The joint to be spot welded is designed so as to bear tensile and shearing force (initially it is subjected to a shearing force, but with increasing deformation also to tensile force), while in some cases pure tension only acts thereon. Tensile strength will be reduced when depth of indentation exceeds a certain limit because of excessive splashing. For some products, splashed welds may be acceptable while excessive depth of indentation should be rejected.

Because the displacement amount I at a certain point of time during the predetermined holding time after the welding current has been deenergized, shows a close correlationship with the depth of indentation E as seen in FIG. 2, and therefore, the indentation E for the product can be judged to be acceptable when the displacement I is larger than a pre-established reference value $I_L$.

Figure 5:
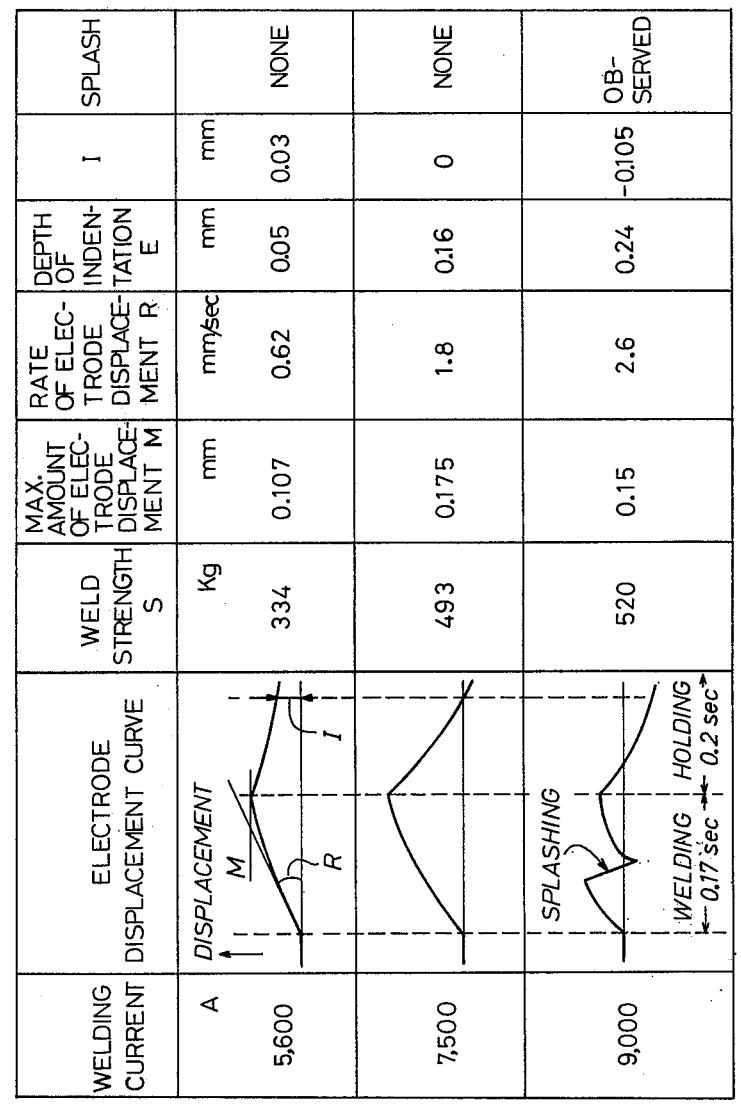
FIG. 5 is a graphical illustration for easy understanding of FIG. 4.
Figure 4:
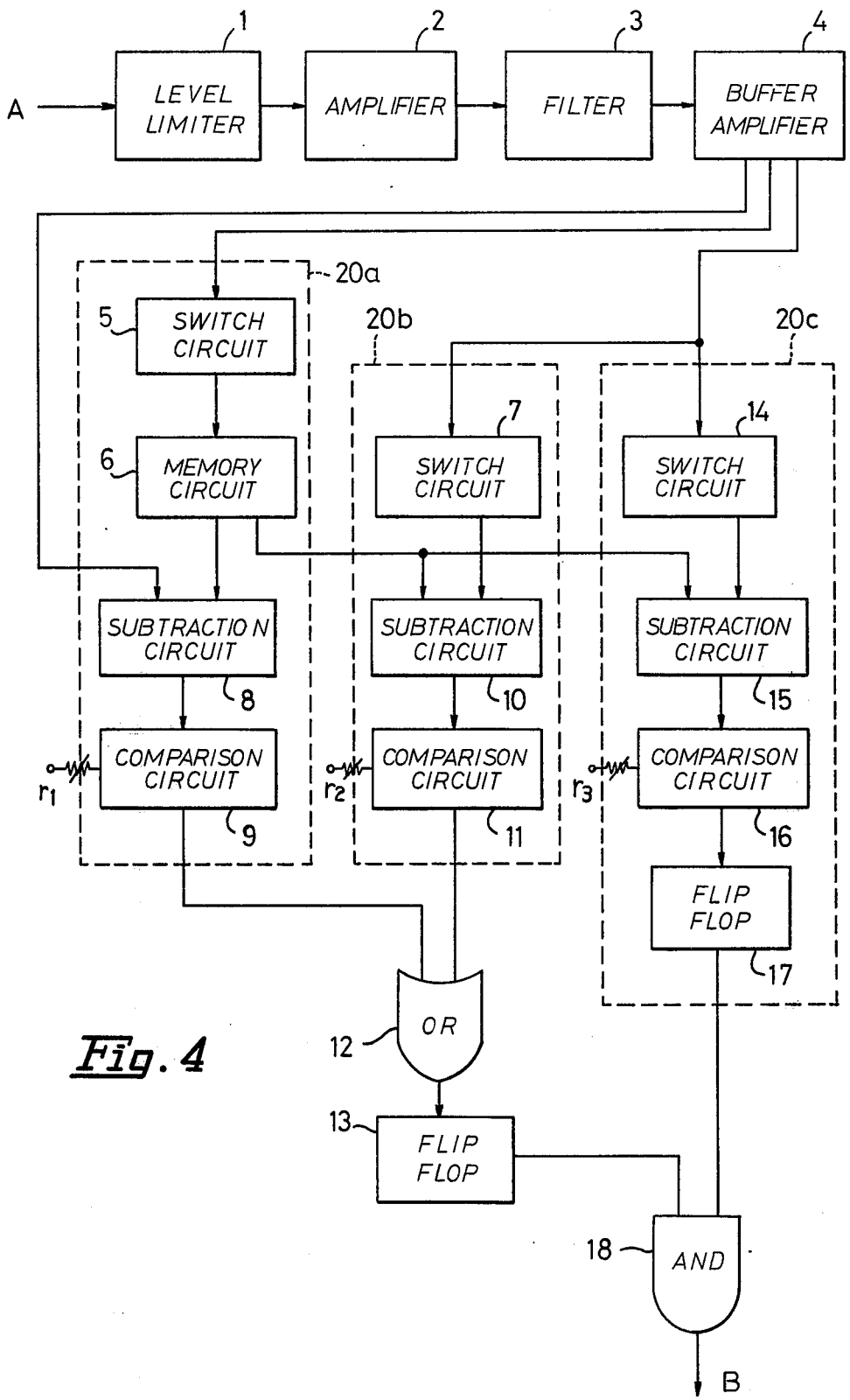
FIG. 4 is a block diagram which shows electrical connection for an embodiment of the present invention.

Now an apparatus embodiment to realize the present invention will be described with reference to FIGS. 4-5.

An electric signal proportional to the vertical displacement of the movable electrode is input to a level limiter 1 from a a sensing means (not shown), such as a differential transformer mounted on the movable electrode of a welder (not shown). When the welder starts operation and the workpieces to be welded are squeezed by loading of the electrode, the output from the sensing means which is input from A in FIG. 4 takes a certain level according to the thickness of the workpieces and electrode tip consumption.

The level limiter 1 excludes a high level input at which the electrode loading actuator (not shown) is positioned before the operation, or at the top dead center thereof. The output from the level limiter 1 is input to an amplifier 2 to be properly amplified, and the output is input to a buffer amplifier 4 through a filter 3. In the buffer amplifier 4, the current is amplified enough to be input to subsequent analogical memory circuits.

Sections 20a, 20b and 20c, encircled with broken lines, are sensing or monitoring sections for aforesaid maximum amount M of electrode displacement, rate R of the displacement, and depth of indentation E, respectively. The output from the buffer amplifier 4 is input to a switch circuit 5 in the section 20a. The switch circuit 5, consisting of a reed relay, an analog switch, etc., is energized for a period indicated as a number 25 in FIG. 5(c) by an electric signal supplied from the control circuit of the welder (not shown). The output from the switch circuit 5 is input to a memory circuit 6 consisting of a condenser, a voltage follower etc. to memorize the voltage level. Therefore, the position of the electrode before energization of the weld current is memorized in the circuit 6 as a voltage level.

The output from the buffer amplifier 4 is simultaneously input to a subtraction circuit 8, in which the input is analogically subtracted from the output of the memory circuit 6. Even when the electrode tip is worn down or consumed and thereby the voltage level from the memory circuit 6 is lowered, the variation of the voltage level is offset with the subtracting amplifier 8 (because the position of the electrode is memorized during the energization time shown as 25 of FIG. 5 (c) for every operation cycle, at the state of pre-loading of the electrode before flowing of the welding current). Thus, only the signal of the electrode movement during flowing of the welding current, e.g., the movement corresponding to the expansion (due to the heat caused by the energization), which is indicated as 21 in FIG. 5 (a), is output from the subtraction amplifier 8. The output from the amplifier 8 is input to a comparison circuit 9 wherein the level of a standard reference value $M_L$, which depends upon the thickness or the material properties of the workpieces, is preset as a resistance $r_1$ (potentiometer), and is compared with the input from the amplifier 8. When the value M exceeds, as the curve 21 in FIG. 5 (a) indicates, the foregoing reference value of $M_L$, the output from said comparison circuit 9 will be input, through an "or"circuit 12, to a flip-flop circuit 13 and set therein in a form of a signal of "acceptable". (The input to the flip-flop 13 remains in the memory to be compared with the output from the flip-flop 17 in the section 20c.) FIG. 5 (b) illustrates an example of the electrode movement when a splash occurs. As aforesaid if the rate R exceeds $R_L$, the weld strength shall be decided to be acceptable even when a splash occurs and the value M is below the standard $M_L$, and the section 20b in FIG. 4 is provided for monitoring the rate value R. The output from the buffer amplifier 4 is also input to a switch circuit 7 in section 20b wherein the switch circuit 7 is energized during a time period 26 as indicated in FIG. 5 (d), by a monostable multi-oscillator (not shown) which is triggered by an electric signal supplied from the control circuit of the welder (not shown), in order to detect the amount of electrode displacement at a certain specific point of welding time (i.e., after a certain preset period of time has elapsed from the start of flowing of the weld current, e.g., just after the start of flowing of the current, as shown in FIG. 5(f) as a representative reference value of the rate R of the electrode displacement. The output of the switch circuit 7 at the end of the time period 26 corresponds to the position of the electrode at that time, and the output of the subtraction circuit 10 corresponds to the displacement ($M_1$) at the time, i.e., to the initial slope of the curve M because the slope can be obtained from the quotient of the displacement ($M_1$) being divided by the known value (time length $T_w$). The output from the subtration amplifier 10, is input to a comparison circuit 11, wherein a standard value of voltage translated from the amount of the reference rate $R_l$ is preset by adjusting a resistance $r_2$ of a potentiometer, with which voltage the output from the subtraction amplifier 10 is compared.

The output from said comparison circuit 11 is to be input to a flip-flop circuit 13 through an or circuit 12 in a form of signal, acceptable strength to be kept in the memory, provided that the amount of electrode movement after a certain time has elapsed during an initial portion of the welding operaton, namely $M_R$ exceeds a standard value of displacement, namely $M_{RL}$ which is preset to provide the standard value of rate of displacement $R_L$ aforementioned, even if the maximum displacement value M of the electrode is less than the standard value of $M_L$ as shown in FIG. 5(b).

As aforesaid, both the maximum amount M of electrode displacement and the rate R of electrode displacement are monitored respectively by the monitoring sections 20a and 20b, and if either one of the foregoing two values exceeds its standard value, a signal of acceptable strength is set in the flip-flop circuit 13 so as automatically to judge the spot weld strength to be acceptable at the time of completion of the operation. However, if the depth of indentation can be utilized as a monitoring parameter, the quality of a spot welded product will be more effectively decided. The section 20c in FIG. 4 is provided for this purpose. The output from the buffer amplifier 4 is also input to another switch circuit 14 of the section 20c wherein the switch circuit 14 is energized during the time period of, a pulse 27, e.g., by a monostable multi-oscillator (not shown) which is triggered by a time-out signal of a timer (not shown) energized by an electric signal supplied from the control circuit of the welder (not shown) at a point of time when a predetermined time has elapsed from the energization end of the welding current, as shown in FIG. 5 (e). The output from the switch circuit 14 is input to a subtraction amplifier 15, where the displacement level of the electrode corresponding to the depth of indentation E is translated into a voltage level which is subsequently input to a comparison circuit 16.

Within the comparison circuit 16, an electric value corresponding to the allowable depth of indentation $E_L$ is preset as a standard reference value $I_L$ by adjusting the resistance $r_3$, with which the output from the subtraction amplifier 15 is compared.

Curves 23 and 24 in FIG. 5(a) and (b), indicate the value I, respectively, when the electrode displacement I monitored at the specific point of time 27 exceeds the value $I_L$ (corresponding to $E_L$), and when the monitored displacement I does not so exceed $I_L$. In the former case (e.g., curve 23), the output from the comparison circuit 16 is input to a flip-flop circuit 17 to set a signal of "allowable depth". When the section 20c for monitoring the weld strength, the outputs from the flip-flop circuits 13 and 17 in a form of signal of acceptable strength and allowable depth are both input to an "and" circuit 18 to be combined. In such a way, if both conditions for weld strength and depth of indentation are simultaneously satisfied, then the output B from the circuit 18 is obtained as a signal of acceptable for both weld strength and depth of indentation.

The present invention is not to be limited to or by details of the particular embodiment thereof illustrated by the drawings, as various other forms of the circuit, for instance, will of course be apparent to those skilled in the art without departing from the concept of the invention or the scope of claims.

What is claimed is:

1. In a method of resistance spot welding by passing current between two confronting electrodes, one movable and one fixed, which squeeze therebetween workpieces to be welded to a product, the improvement wherein said method further comprises the steps of:
   sensing the maximum displacement (M) between the two electrodes during flow of the current;
   sensing the rate of displacement with time (R) in an initial stage of flow of the current during welding; and
   rejecting the weld only if both of the following conditions occur -
   i. the maximum displacement (M) is less than a reference value for maximum displacement ($M_L$) pre-established for the product as being the minimum displacement necessary to achieve a lower limit ($S_L$) of strength required, and
   ii. the sensed rate of displacement (R) is less than a reference value for rate of displacement ($R_L$) pre-established for the product as being between a first rate value ($R_L$) which is the minimum rate necessary to achieve the lower limit ($S_L$) of strength required and a second rate value ($R_E$) which corresponds to a maximum weld strength ($S_E$) to obtain which some splash will necessarily occur.

2. The method in accordance with claim 1 further including the step of:
   measuring the position of said movable electrode at the time when a predetermined time has elapsed from the time when the welding current stops flowing; and
   if the weld is not rejected by said rejecting step, rejecting the weld if the position measured in said measuring step, of said movable electrode exceeds a pre-established reference value of indentation.

3. An apparatus for judging physical qualities of a resistance spot weld comprising:

i. a welding unit having a fixed electrode and a movable electrode to squeeze workpieces to be welded therebetween;
ii. a sensing means for sensing the relative displacement between said electrodes;
iii. a first electric circuit for memorizing a first parameter corresponding to the position of said movable electrode before the welding current is energized;
iv. a second electric circuit for subtracting said memorized first parameter from a second parameter corresponding to the instantaneous position of said movable electrode as it is moving and issuing an output signal corresponding thereto;
v. a third electric circuit comparing the output signal from the second circuit with a first preset parameter and issuing an output signal corresponding thereto when the output signal from the second circuit is greater than the first preset parameter;
vi. a fourth electric circuit comparing the output signal from the second circuit at a point of time just after the elapsing of a preset time from the start of the flowing of the welding current, with a second preset parameter and issuing an output signal corresponding thereto when the output signal from the second circuit after said preset time is greater than said second preset parameter; and
vii. an or circuit to which is fed as input the output signals from said third and fourth circuits and issuing an output signal indicating acceptability of the weld when either of said or circuit input signals are present.

4. The apparatus of claim 3 which further comprises a fifth electric circuit comparing a third preset parameter with the output signal from said second circuit at a second specific preset point of time after completion of the flowing of the welding current and issuing an output signal when said third preset parameter is less than said output signal from said second circuit at said second point of time.

5. The apparatus of claim 4 which comprises:
i. a "flip-flop" circuit to which the output from said or circuit is input, thus setting a signal of acceptable strength in said flip-flop circuit;
ii. a second flip-flop circuit to which the output of said fifth electric circuit is input, thus setting a signal of acceptable depth in said second flip-flop circuit; and
iii. an and circuit connected to said two flip-flop circuits and issuing an output signal indicating the presence of an acceptable spot-weld when both said flip-flop circuits have a signal set therein indicating acceptability.

* * * * *